(No Model.)

W. F. BOWERS.
HOSE.

No. 554,649. Patented Feb. 18, 1896.

Witnesses.

Inventor.
William F. Bowers
by N. A. Acker
atty.

UNITED STATES PATENT OFFICE.

WILLIAM F. BOWERS, OF SAN FRANCISCO, CALIFORNIA.

HOSE.

SPECIFICATION forming part of Letters Patent No. 554,649, dated February 18, 1896.

Application filed March 13, 1895. Serial No. 541,560. (No model.)

*To all whom it may concern:*

Be it known that I, WILLIAM F. BOWERS, a citizen of the United States, residing at San Francisco, in the county of San Francisco and State of California, have invented certain new and useful Improvements in Hose; and I do hereby declare the following to be a full, clear, and exact description of said invention, such as will enable others skilled in the art to which it most nearly appertains to make, use, and practice the same.

My present invention relates to a certain new and useful improvement in that class of hose designed for fire purposes, or such hose as is composed of an inner tube of rubber covered by an outer coating of cotton or other textile fabric. In this class of hose it is required that the hose withstand great internal pressure, and the trouble has heretofore been to secure the ends of the hose within the coupling so that the coupling will not pull off by the pressure of the retained water. While the hose proper will withstand a pressure considerably over three hundred pounds per square inch, it has been nearly impossible to secure the ends of the hose within the coupling so as to withstand more than a pressure of about three hundred pounds per square inch. Above this pressure, the coupling will blow off the hose. It is to provide against the blowing off of the coupling that my invention relates.

In order to fully understand my invention, reference must be had to the accompanying sheet of drawings, wherein—

Figure 1:
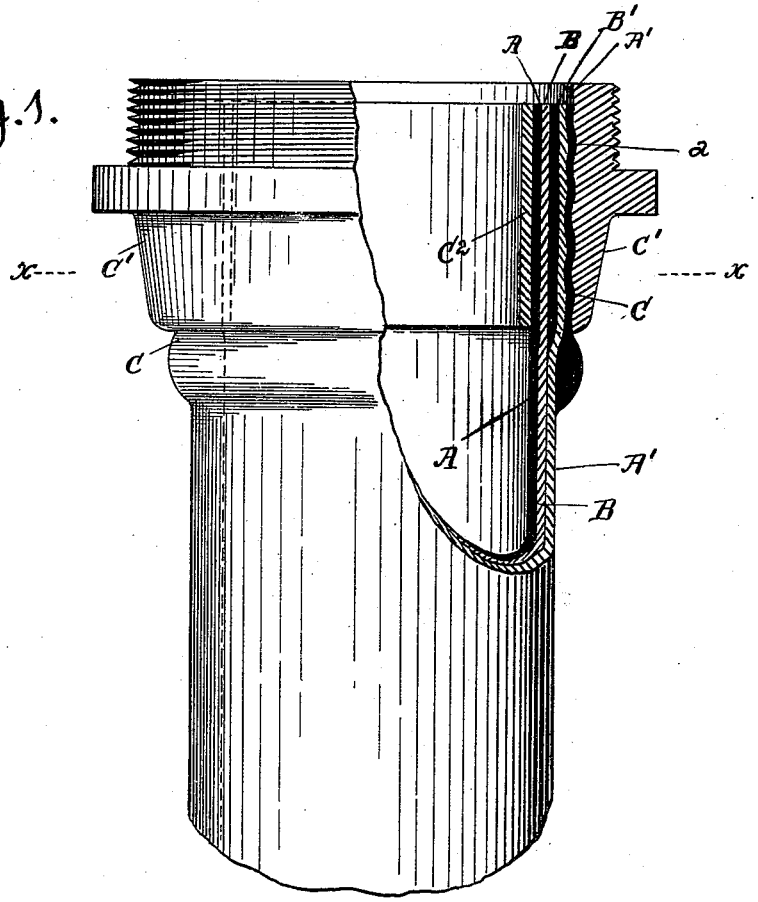
Figure 2:
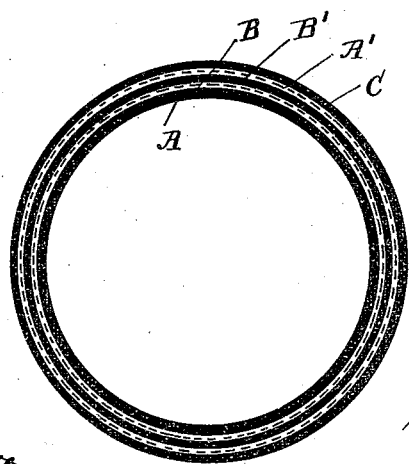

Figure 1 is a view in elevation showing the end of a hose and its coupling-ring partly broken away; and Fig. 2 is a cross-sectional plan view taken through line $x$ $x$ of Fig. 1, the expanding-ring and coupling-ring being left out.

In the drawings, the letter A indicates the inner tube of rubber, B the inner textile covering, and A' the outer textile covering or tube. Between the inner and outer textile coverings or tubes B and A', at the ends thereof, which enter the coupling-rings, I insert or interpose a piece or layer of rubber B', which rubber is inserted while in a soft or pliable condition. After this piece of rubber is inserted between the textile coverings or tubes, which is inserted for the purpose of preventing the textile fabric located within the coupling from becoming soaked with water, the soaking of which causes the fabric of the hose to quickly decay and break at this point, I place around the ends of the outer textile coverings a band, collar, or piece of soft rubber C. After these pieces of rubber B' and C are in place, they are firmly pressed into the fiber of the coverings B and A' and secured thereto by placing the end of the hose within a suitable mold, under pressure, and then applying heat thereto, which causes the rubber to melt or soften and flow or penetrate into the fiber of the textile. This penetration of the rubber into the fiber of the textile is what I term "filling" the end of the hose. The inserted piece of rubber B' and outer band or collar, C, reinforces the ends of the hose for about four inches or more, as desired, and provides a hose with what may be termed a "filled" end. Of course it will be understood that the inner band or piece of rubber, B', is only made use of when more than one textile covering is used in the manufacture of the hose.

The reinforced or filled end of the hose fits within the coupling-ring C', and is securely held in place by the expander-ring C², which expander-ring forces the outer face or surface of the rubber collar or band C tightly against the inner wall of the coupling-ring C'. The inner face of this ring being corrugated, as shown at $a$, the outer rubber surface of the end of the hose will be compressed therein and the hose prevented from pulling from within the ring. I have ascertained by practical tests that the hose when the end is thus filled will withstand a pressure of about eight hundred pounds per square inch without the coupling blowing off.

Inasmuch as the textile fabric of the hose, when the hose is in use, is constantly saturated with water, it is obvious that unless a rubber collar or band be firmly united to the end of the hose, or when two textile coverings are used, be inserted therebetween, as well as covering the ends of the outer covering, the water will seep between the inner rubber tube of the hose and the inner wall of the coupling-ring and the end portion of the hose be maintained continually moist. The moisture of the textile fabric at the covered end portion of the hose causes the fiber of the textile fabric to quickly decay. By filling the end of the hose with rubber, as above described, I obviate this defect, for the rubber filling will prevent the water penetrating the fiber of the textile covering secured within the coupling.

Unless the coupling end of the hose or that portion which enters the coupling-ring be filled or reinforced with rubber (which is pressed into the fiber of the textile covering and secured thereto by vulcanization) it is impossible to secure the end within the coupling-ring so as to withstand a high internal pressure. This is due to the fact that the cotton or textile fabric composing the outer covering of the hose is of such a soft, spongy consistency that it gives after it has been secured in place by the expanding-ring to the pressure exerted thereon and slips from beneath the coupling-ring. By providing the hose with a rubber-filled end (and by the expression "filled end" as here used I wish to be understood as covering the hose whether made of one or more textile-fabric coverings) I provide a solid end which will not give to internal pressure after being secured in place within the coupling-ring.

I am aware that a rubber vulcanized thimble or sleeve, which is fitted over the end of the hose before it is secured within the coupling-ring, has heretofore been made use of to prevent the slipping off of the coupling-ring, but this only partly answers the purpose. While the rubber surface of such a thimble or sleeve permits a much stronger frictional hold to be secured than when the hose is secured within the coupling-ring without its use, it does not prevent the slipping of the hose from the coupling-ring when an internal pressure of over three hundred pounds per square inch is placed upon the hose. This is due to the fact that the rubber is not embedded within the fiber of the textile fabric. Consequently owing to the spring or spongy nature of the fabric it gives to the pressure and slips away from the coupling-ring. I am also aware of the fact that a textile hose—as, for instance, a drop-light hose—provided with a rubber tip, so as to permit the end of the hose to fit over different-sized burners, is old, and I do not wish to be understood as making any attempt to claim these features.

Having thus described my invention, what I claim as new, and desire to secure protection in by Letters Patent, is—

1. In a hose, the combination with the outer textile-fabric coverings, a layer of rubber interposed between the end portion of said coverings, and a rubber collar secured around the end portion of the outer textile-fabric covering.

2. As a new article of manufacture a hose comprising two outside layers of textile fabric arranged one on the other and constituting the covering, and a layer of impervious material interposed and secured between the end portions only of the covering, substantially as described.

3. A hose consisting of an inner rubber lining, an outer textile-fabric covering, and an outer rubber collar on the end section having its inner portion permanently embedded in the interstices of the textile-fabric covering, substantially as described.

In testimony whereof I affix my signature in presence of two witnesses.

WILLIAM F. BOWERS.

Witnesses:
N. A. ACKER,
LEE D. CRAIG.